United States Patent

Byer

Patent Number: 5,285,749
Date of Patent: Feb. 15, 1994

[54] ANT PROOF DISH AND STAND

[75] Inventor: Gary M. Byer, Richmond, Calif.

[73] Assignee: Gary Byer, Richmond, Calif.

[21] Appl. No.: 17,005

[22] Filed: Feb. 12, 1993

[51] Int. Cl.⁵ .............................................. A01K 5/00
[52] U.S. Cl. ..................................................... 119/61
[58] Field of Search ............... 119/61, 51.5, 63, 51.01; 43/131, 133, 134, 136, 58

[56] References Cited

U.S. PATENT DOCUMENTS

| | | | |
|---|---|---|---|
| 4,803,954 | 2/1989 | Welch et al. | 119/61 |
| 4,953,506 | 9/1990 | Sanders | 119/61 |
| 5,000,123 | 3/1991 | Morse et al. | 119/61 |
| 5,125,364 | 6/1992 | Sagucio . | |

Primary Examiner—Gene Mancene
Assistant Examiner—Thomas Price

[57] ABSTRACT

An oval shaped pet food dish with open top having peripheral flange joined at top with a downward and outward shaped peripheral skirt for stability. The dish is supported up off the floor by a plurality of pillars having a down sloping hemispherical shaped collar at their top enough distance to make it impossible for ants to crawl up into dish.

Also a potted plant stand having a round flat top with downward sloping peripheral edge will be supported up off the floor by these same type pillars as described for the pet food dish.

1 Claim, 2 Drawing Sheets

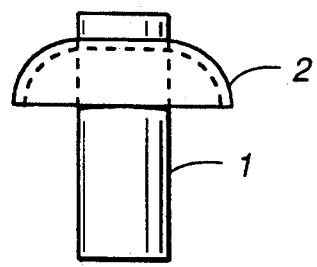
FIG._1
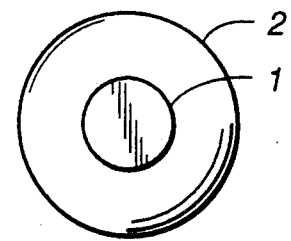
FIG._2
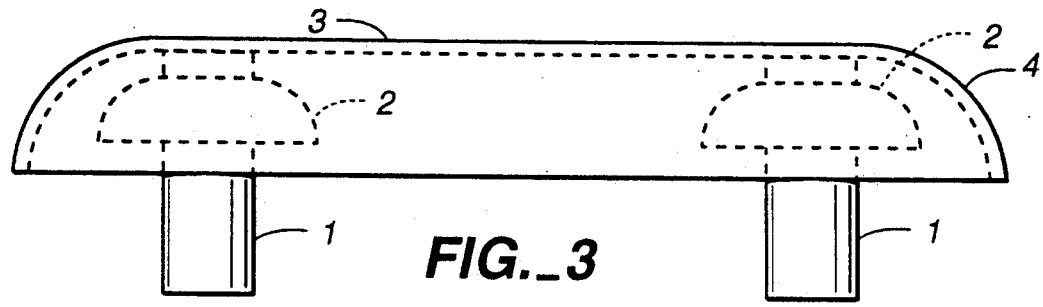
FIG._3
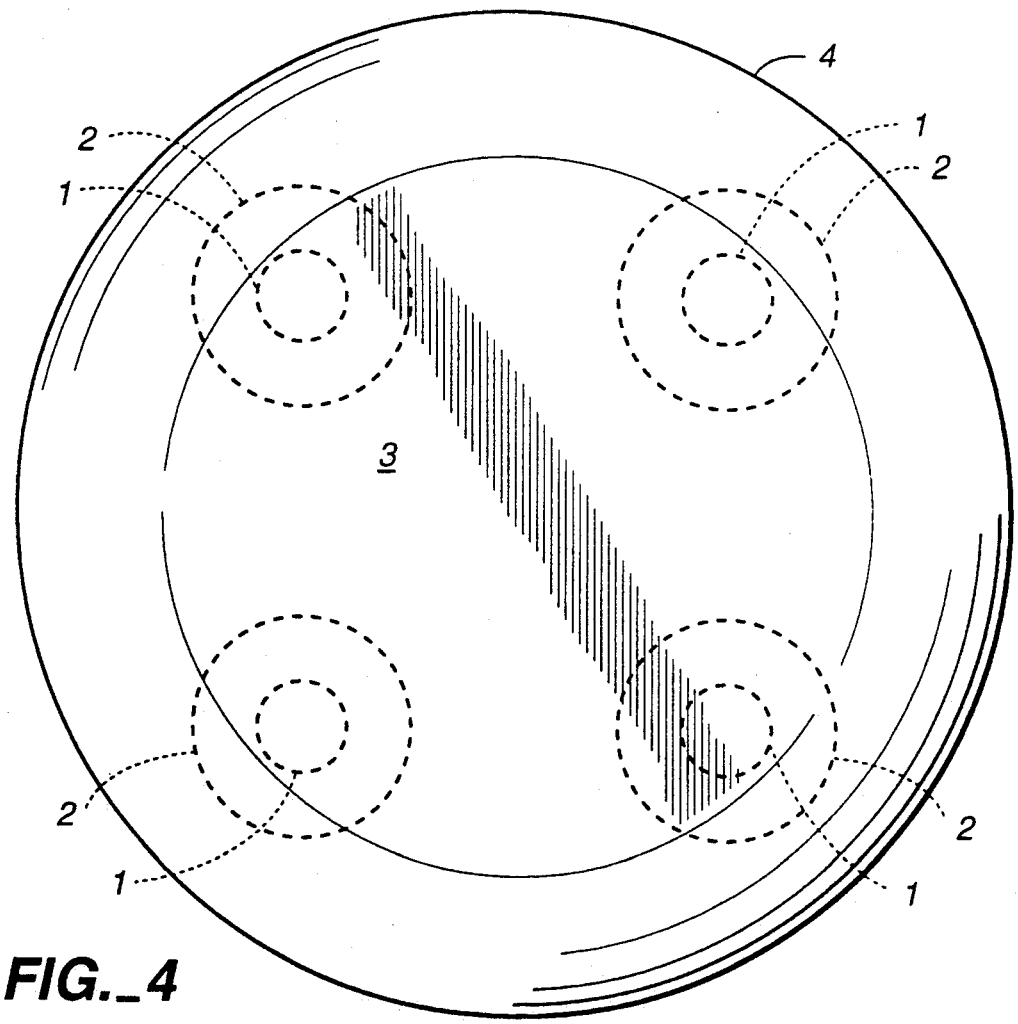
FIG._4

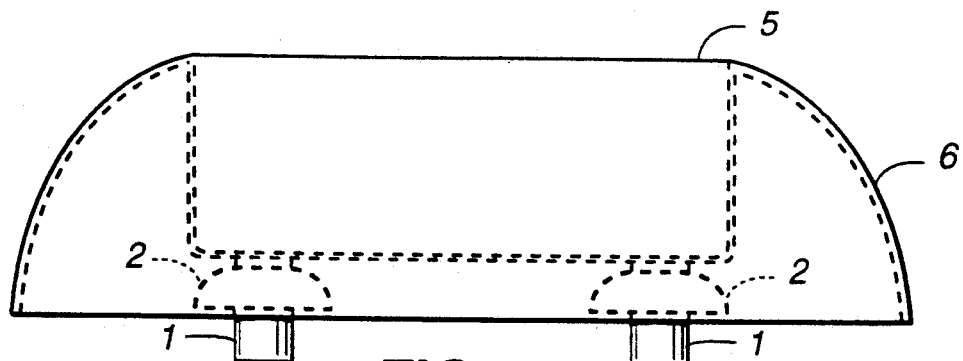
FIG._5
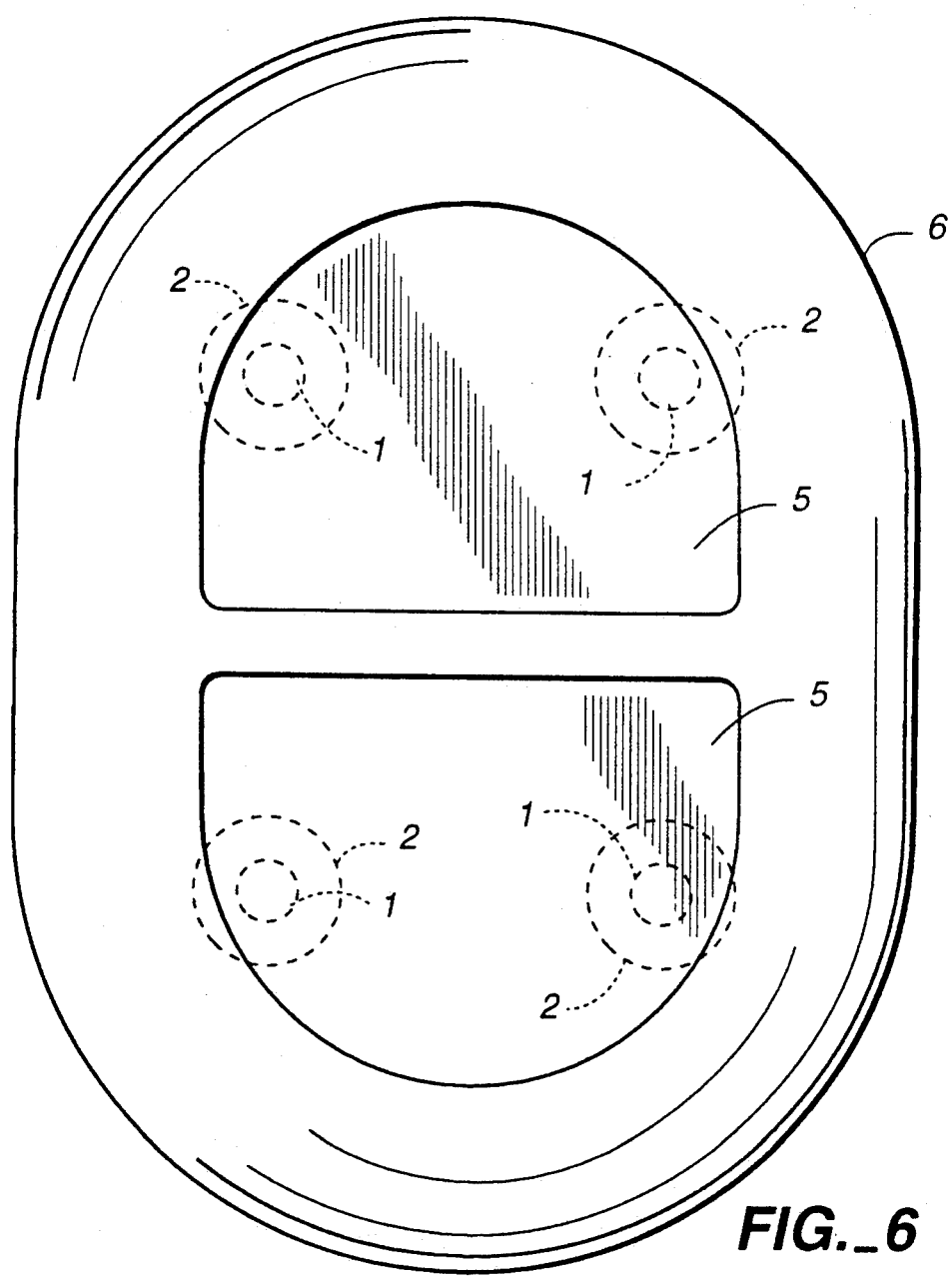
FIG._6

ANT PROOF DISH AND STAND

SUMMARY OF THE INVENTION

This will fill the need of many pet owners and plant growers whom are bothered by the intrusion of ants and other crawling insects.

In a preferred embodiment of the invention there is provided a plurality of pillars about the underside periphery for elevating the pet food dish and plant support stand off the floor. The support pillars have embodied in their upper portion a downward slopping hemispherical collar that makes it difficult if not impossible for ants to climb.

An accessory is provided for people who already have pet food dishes or plant stands. The support pillars as described above could be produced and marketed separately as an add-on to be glued onto their pet food dishes and plant stands.

As well, this would be good for those concerned about the environment and the well being of their pet by making it possible to rid their dish of ants without the spraying of pesticides.

BRIEF DESCRIPTION OF THE DRAWINGS

FIG. 1 is a view of support pillar with hemispherical collar from the side.

FIG. 2 is another view of support pillar from the top.

FIG. 3 is a side view of stand utilizing support pillars.

FIG. 4 is top view of stand showing relative position of support pillars.

FIG. 5 is a side view of a pet food dish with support pillars.

FIG. 6 is a top view of the pet food dish showing relative position of support pillars.

DETAILED DESCRIPTION OF INVENTION

Referring now to the drawings, the preferred embodiment of the invention comprises a generally oval bowl shown in FIG. 6 encompassing two half oval recessed areas 5 to hold ample enough food and water for an average size dog or cat. The recessed container areas 5 with open tops as shown in FIG. 6 are surrounded by a peripheral flange 6 joined at the top with a downward and outward slopping peripheral skirt for extra support and stability.

The foregoing description up to this point resembles a conventional pet feeding dish; however as shown in FIG. 5-6 the unit also includes support pillars 1 to elevate the dish a short distance off the floor as shown in FIG. 5. The pillars FIG. 1-2 are comprised of vertical cylindrical posts 1 relatively small in diameter and will have attached to their upper portion a hemispherical shaped downward sloping collar 2. The collar 2 resides at the top of pillar 1 and surrounds it as shown in FIG. 1-3. FIG. 5 shows the preferred embodiment of the pillars 1 and collars 2 in relation to the dish 5-6. The pillars 1 and collar 2, FIG. 1-2 in their preferred embodiment would be made of plastic.

Also included in the invention is a planted pot holder stand FIG. 3-4 shown in the preferred embodiment, comprised of a top round plate 3 having a down turned peripheral outer edge 4. The plate 3 is supported by the same pillars 1 and collars 2 as the pet food dish FIG. 5-6 as described above and shown in FIG. 3-4.

The pillars 1 with collars 2 shown in FIG. 1-2 may be utilized in their entirety and marketed separately from the dish FIG. 5-6 or plate FIG. 3-4.

I claim:

1. An elevated oval feeding dish having open top with peripheral flange joined at top with a downward and outward sloping peripheral skirt and supported above floor level by a plurality of pillars having a downward sloping hemispherical shaped collar attached to their top.

* * * * *